US012265892B2

(12) United States Patent
Sharma et al.

(10) Patent No.: US 12,265,892 B2
(45) Date of Patent: Apr. 1, 2025

(54) UTILIZING MACHINE LEARNING MODELS TO CHARACTERIZE A RELATIONSHIP BETWEEN A USER AND AN ENTITY

(71) Applicant: Capital One Services, LLC, McLean, VA (US)

(72) Inventors: Meghnath Sharma, Chantilly, VA (US); Vivek Bharatam, Aldie, VA (US); Dinanath Nadkarni, Wake Forest, NC (US)

(73) Assignee: Capital One Services, LLC, McLean, VA (US)

( * ) Notice: Subject to any disclaimer, the term of this patent is extended or adjusted under 35 U.S.C. 154(b) by 1129 days.

(21) Appl. No.: 17/139,507

(22) Filed: Dec. 31, 2020

(65) Prior Publication Data
US 2022/0207420 A1    Jun. 30, 2022

(51) Int. Cl.
*G06N 20/00* (2019.01)
*G06F 18/23213* (2023.01)
*G06F 18/2431* (2023.01)

(52) U.S. Cl.
CPC ....... *G06N 20/00* (2019.01); *G06F 18/23213* (2023.01); *G06F 18/2431* (2023.01)

(58) Field of Classification Search
CPC .......... G06N 20/00; G06N 3/08; G06N 3/063; G06N 3/04; G06F 18/23213; G06F 18/2431
See application file for complete search history.

(56) References Cited

U.S. PATENT DOCUMENTS

| 10,949,825 | B1* | 3/2021 | Brosamer | G06N 20/00 |
| 11,042,930 | B1* | 6/2021 | Mintz | G06N 20/20 |
| 2006/0179021 | A1* | 8/2006 | Bradski | G06F 18/23 706/20 |
| 2020/0402156 | A1* | 12/2020 | Maitra | G06Q 40/02 |
| 2020/0412726 | A1* | 12/2020 | Nevatia | G06N 20/00 |

* cited by examiner

*Primary Examiner* — Kamran Afshar
*Assistant Examiner* — Brian J Hales
(74) *Attorney, Agent, or Firm* — Harrity & Harrity, LLP

(57) ABSTRACT

In some implementations, a device may identify an account associated with a user, and the account may be managed by an entity. The device may determine, using at least one machine learning model, a classification of the user that indicates a level of quality of a relationship between the user and the entity. The device may determine, based on the classification determined using the at least one machine learning model, one or more adjustments that are to be applied to one or more charges assessed to the account by the entity. The device may apply the one or more adjustments to the one or more charges.

20 Claims, 10 Drawing Sheets

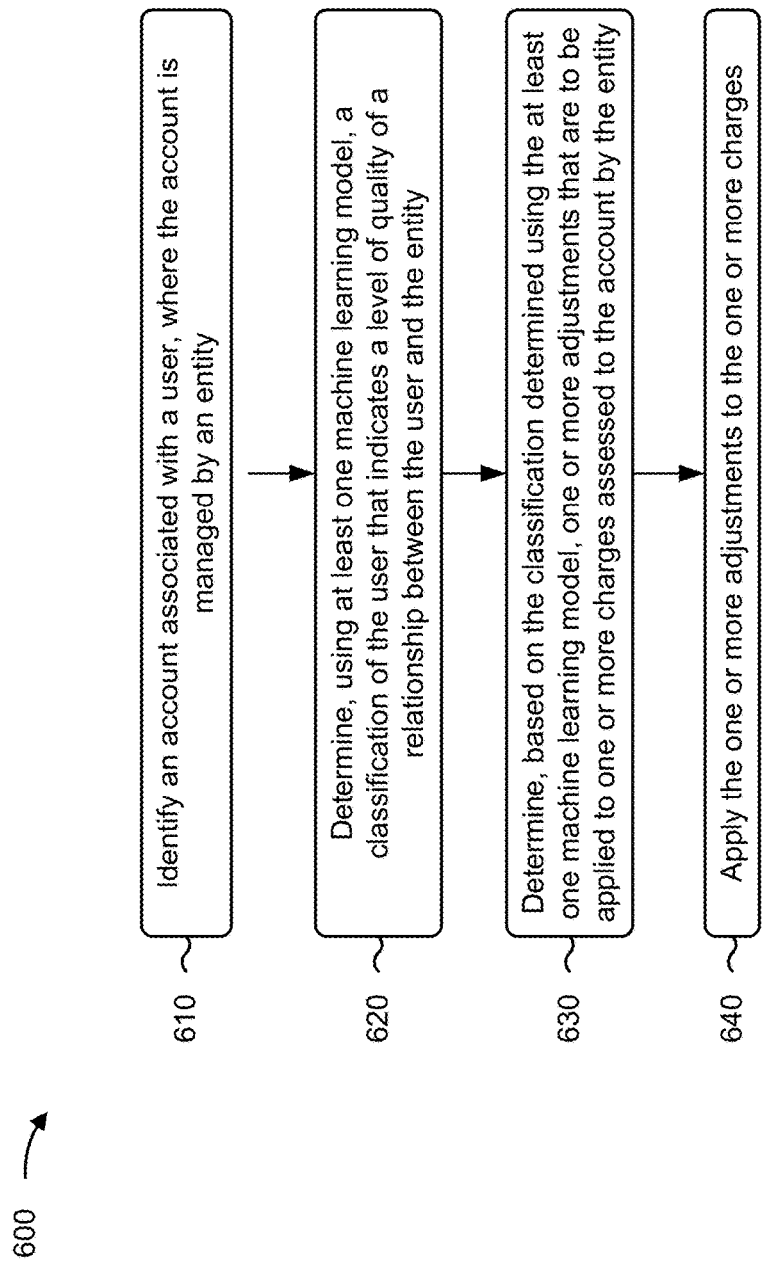

… (1)

UTILIZING MACHINE LEARNING MODELS TO CHARACTERIZE A RELATIONSHIP BETWEEN A USER AND AN ENTITY

BACKGROUND

A transaction account may include a checking account, a savings account, a rewards account, a credit account, and/or a demand deposit account, among other examples. A transaction account may be held by an individual at a financial institution. A transaction account may be accessible to an owner of the transaction account at a request by the owner (e.g., "on demand"). In addition, the transaction account may be available to other individuals, other than the owner of the account, as directed by the owner of the account.

SUMMARY

In some implementations, a system for machine learning-based classification includes one or more memories, and one or more processors, communicatively coupled to the one or more memories, configured to: identify an account associated with a user, where the account is managed by an entity; determine, using an unsupervised machine learning model, a cluster of users to which the user belongs; determine, using a supervised machine learning model, a classification of the user that indicates a level of quality of a relationship between the user and the entity, where the supervised machine learning model is trained to identify the classification based on a plurality of features, and where the plurality of features are based on the cluster of users determined using the unsupervised machine learning model; determine, based on the classification determined using the supervised machine learning model, whether one or more adjustments are to be applied to one or more charges assessed to the account by the entity; and applying the one or more adjustments to the one or more charges assessed to the account based on determining that the one or more adjustments are to be applied to the one or more charges.

In some implementations, a non-transitory computer-readable medium storing a set of instructions includes one or more instructions that, when executed by one or more processors of a device, cause the device to: determine, using an unsupervised machine learning model, a cluster of users to which a user belongs, where the user is associated with an account, and where the account is managed by an entity; determine, using a supervised machine learning model, a classification of the user that indicates a level of quality of a relationship between the user and the entity, where the supervised machine learning model is trained to identify the classification based on a plurality of features, and where the plurality of features are based on the cluster of users determined using the unsupervised machine learning model; determine, based on the classification determined using the supervised machine learning model, one or more actions that are to be performed; and perform the one or more actions based on determining the one or more actions.

In some implementations, a method for machine learning-based classification includes identifying, by a device, an account associated with a user, where the account is managed by an entity; determining, by the device and using at least one machine learning model, a classification of the user that indicates a level of quality of a relationship between the user and the entity; determining, by the device and based on the classification determined using the at least one machine learning model, one or more adjustments that are to be applied to one or more charges assessed to the account by the entity; and applying, by the device, the one or more adjustments to the one or more charges.

BRIEF DESCRIPTION OF THE DRAWINGS

FIG. 6 is a flowchart of an example process relating to utilizing machine learning models to characterize a relationship between a user and an entity.

DETAILED DESCRIPTION

Figure 1A:
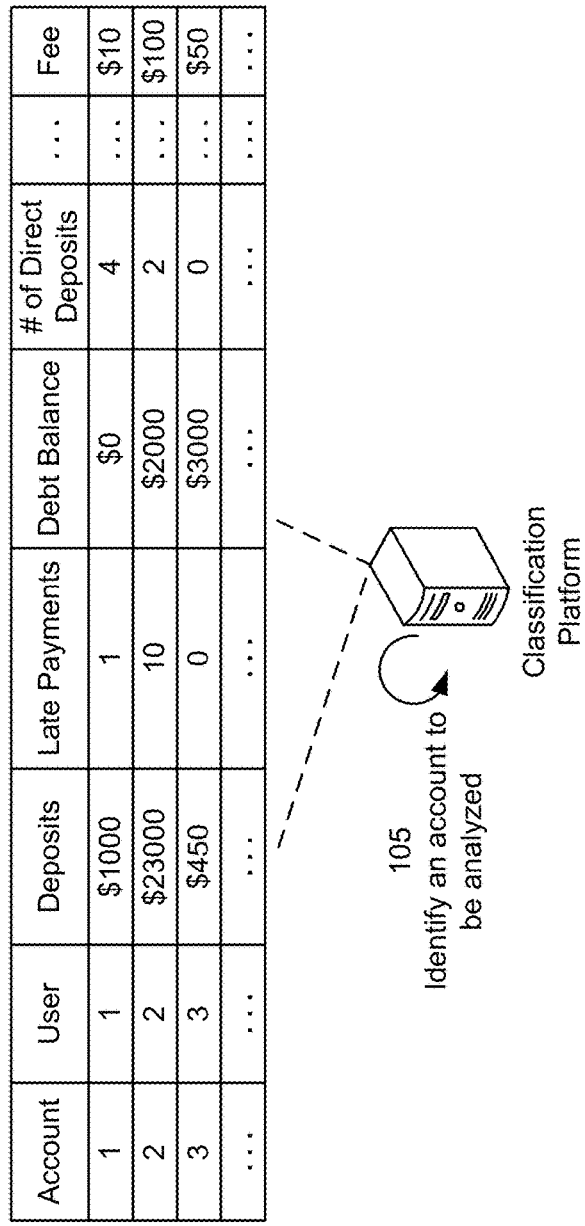
FIGS. 1A-1E are diagrams of an example implementation relating to utilizing machine learning models to characterize a relationship between a user and an entity.

The following detailed description of example implementations refers to the accompanying drawings. The same reference numbers in different drawings may identify the same or similar elements.

A user (e.g., a customer) may hold one or more accounts with an entity (e.g., a financial institution). Occasionally, the entity may provide offers, incentives, and/or rebates, among other examples, to account holders. However, this may require the entity to manually review accounts and users to determine appropriate actions and/or offerings on a per user basis. For example, the entity may engage in a manual trend analysis for an account and a user in an attempt to characterize a relationship between the user and the entity in connection with the account. This process is tedious, can produce erroneous results, and may fail to identify relevant associations within data. Alternatively, the entity may take a one-size-fits-all approach, which may result in actions and/or offerings that are poorly matched to accounts and users. For example, the actions and/or offerings may not reflect a relationship between a user and the entity.

In some implementations, to solve the problems described above, as well as a related technical problem of how to automate trend analysis for accounts and users of an entity, a technical solution is described herein for using machine learning (ML) to characterize a relationship between a user and an entity. In some implementations, a machine learning system may include an unsupervised machine learning model (which may be referred to herein as an "unsupervised model") and a supervised machine learning model (which may be referred to herein as a "supervised model"). The unsupervised model may be used to determine a cluster of users (e.g., a segment) to which a user belongs based on behavioral attributes of the user (e.g., in connection with an account). The supervised model may be used to determine a classification for the user that indicates a level of quality of a relationship between the user and the entity (e.g., a positive relationship, a neutral relationship, a negative relationship, etc.). The supervised model may be trained to identify the classification using a plurality of features that are based on the cluster of users determined using the unsupervised model. Accordingly, offers, incentives, and/or rebates may be determined automatically for the user based on the classification.

In this way, the machine learning system may apply a rigorous and automated process for trend analysis to characterize a relationship between a user and an entity. The machine learning system enables recognition and/or identification of tens, hundreds, thousands, or millions of features and/or feature values for tens, hundreds, thousands, or millions of observations, thereby increasing accuracy and consistency and reducing delay associated with using trend analysis to characterize a relationship between a user and an entity relative to requiring computing resources to be allocated for tens, hundreds, or thousands of operators to manually review accounts and user data using the features or feature values. Accordingly, highly relevant actions and offerings for the user or the user's account can be presented and performed.

FIGS. 1A-1E are diagrams of an example 100 associated with utilizing machine learning models to characterize a relationship between a user and an entity. As shown in FIGS. 1A-1E, example 100 includes a classification platform and a user device, which are described in more detail in connection with FIGS. 4 and 5. The classification platform may include or may be included in a machine learning system. The classification platform may be associated with an entity (e.g., a financial institution) that manages accounts associated with users (e.g., customers).

As shown in FIG. 1A and by reference number 105, the classification platform may identify an account (e.g., an account managed by the entity) that is to be analyzed. For example, the account may be analyzed for a charge adjustment. The classification platform may identify the account based on a determination that a charge (e.g., a fee, such as a fee associated with a failure to maintain a minimum account balance or a fee associated with a failure to achieve a threshold amount of deposits, such as direct deposits, in a particular time period) was assessed to the account by the entity. Additionally, or alternatively, the classification platform may identify the account based on a determination that a balance of the account satisfies one or more conditions. For example, a condition may be that the balance satisfies a threshold value (e.g., for a threshold time period), that the balance is below a threshold value (e.g., for a threshold time period), that the balance is zero, and/or that the balance is associated with a threshold amount of volatility (e.g., a threshold standard deviation), among other examples.

The account may be associated with a user. In addition, the user may be associated with multiple accounts managed by the entity. In some examples, the classification platform may identify the account based on an event associated with the user. For example, the event may be a deposit event (e.g., the user depositing funds to the account), a withdrawal event (e.g., the user withdrawing funds from the account), a credit event (e.g., the user receiving a loan from the entity), a default event (e.g., the user defaulting on an obligation to the entity), and/or an overdue event (e.g., the user failing to make a timely payment), among other examples.

In some cases, the classification platform may identify the account based on identifying the user. For example, the classification platform may identify the user based on the occurrence of an event, as described above, and may identify the account based on an association of the user and the account. In some implementations, the classification platform may identify the user, and may not identify the account (e.g., if an action that is to be performed, or an offer that is to be presented, relates to the user and does not relate to the account).

Figure 1B:
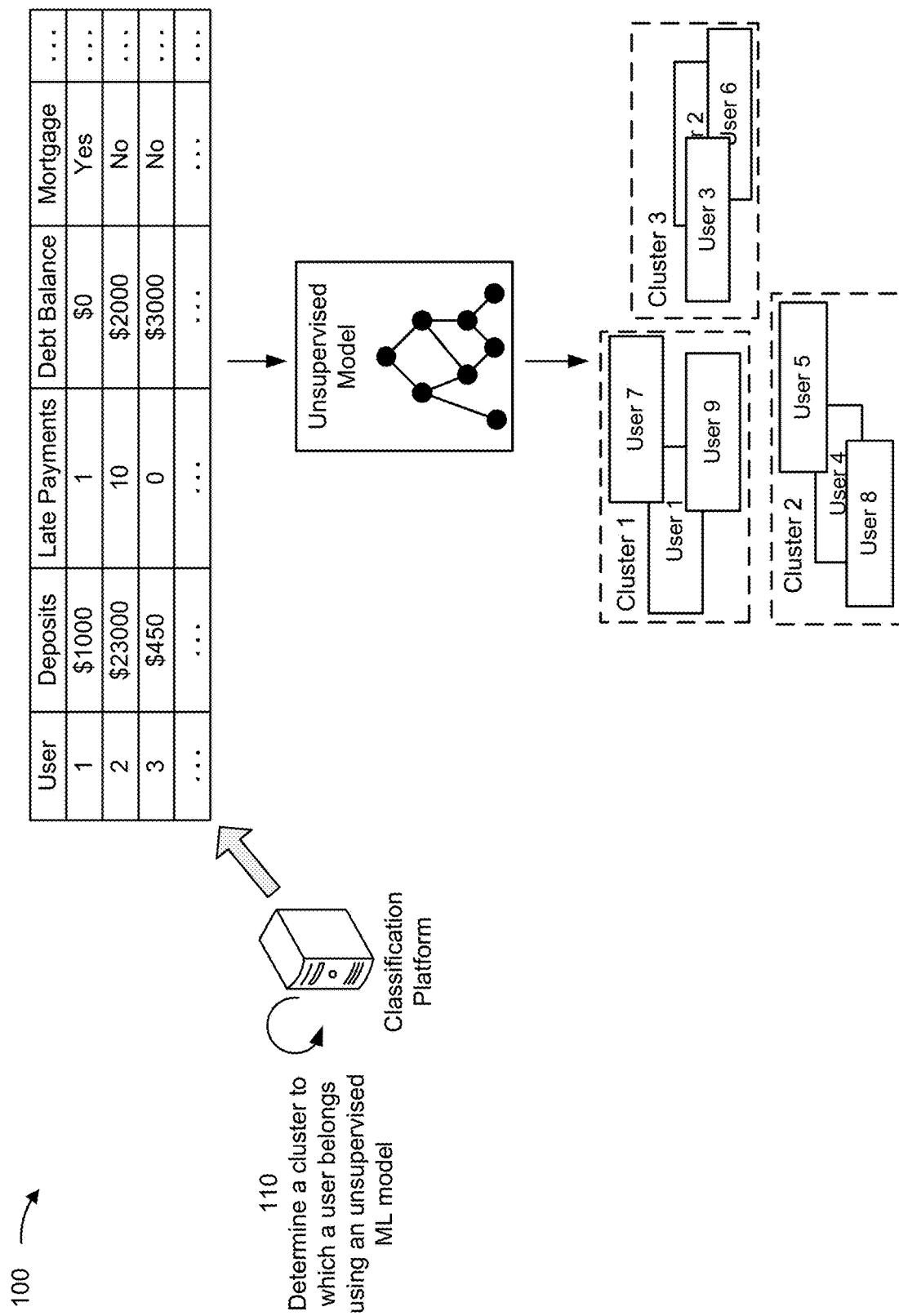

As shown in FIG. 1B and by reference number 110, the classification platform may determine a cluster of users (e.g., a segment) to which the user belongs. The classification platform may determine the cluster of users to which the user belongs using an unsupervised model. For example, the unsupervised model may be based on a frequent pattern (FP) tree, a modified FP tree, and/or an apriori algorithm, among other examples. The classification platform may use the unsupervised model to group users (e.g., customers) into segments based on attributes of the users. The attributes may be behavioral attributes (e.g., attributes relating to a behavior or a behavioral pattern of a user, such as whether the user makes timely payments), demographic attributes (e.g., attributes particular to a user within a population, such as an income or an education level of the user), and/or transactional attributes (e.g., attributes relating to transactions between a user and the entity, such as whether the user received a loan from the entity or a monthly amount of deposits made by the user).

In some implementations, the unsupervised model used by the classification platform may be configured to perform clustering in a desired manner. For example, the classification platform, or another device, may perform one or more preliminary clusterings (e.g., in connection with an initial configuration of the unsupervised model and prior to the clustering of the user described above) of users using the unsupervised model to enable configuration of the unsupervised model. Here, the resultant clusters may be reviewed by an operator (e.g., a domain expert) of the machine learning system to determine category labels corresponding to the clusters (e.g., a "renters" cluster, a "homeowners with no mortgage" cluster, a "homeowners with a mortgage" cluster, etc.). Alternatively, the classification platform, or another device, may employ an automated process to determine the category labels. In some implementations, the classification platform, or another device, may obtain input (e.g., from an operator) that assigns respective category labels for clusters of users determined using the unsupervised model. Based on the category labels, one or more relevant clusters (and non-relevant clusters) may be identified, and the unsupervised model may be configured (e.g., the user data used for the preliminary clusterings may be modified) so that users are clustered into one of the relevant clusters and not clustered into one of the non-relevant clusters. The one or more relevant clusters may be identified by an operator of the machine learning system. Additionally, or alternatively, the classification platform, or another device, may employ an automated process to identify the one or more relevant clusters. In some implementations, the classification platform, or another device, may obtain input (e.g., from an operator) that identifies the relevant clusters (and/or the non-relevant clusters).

Figure 1C:
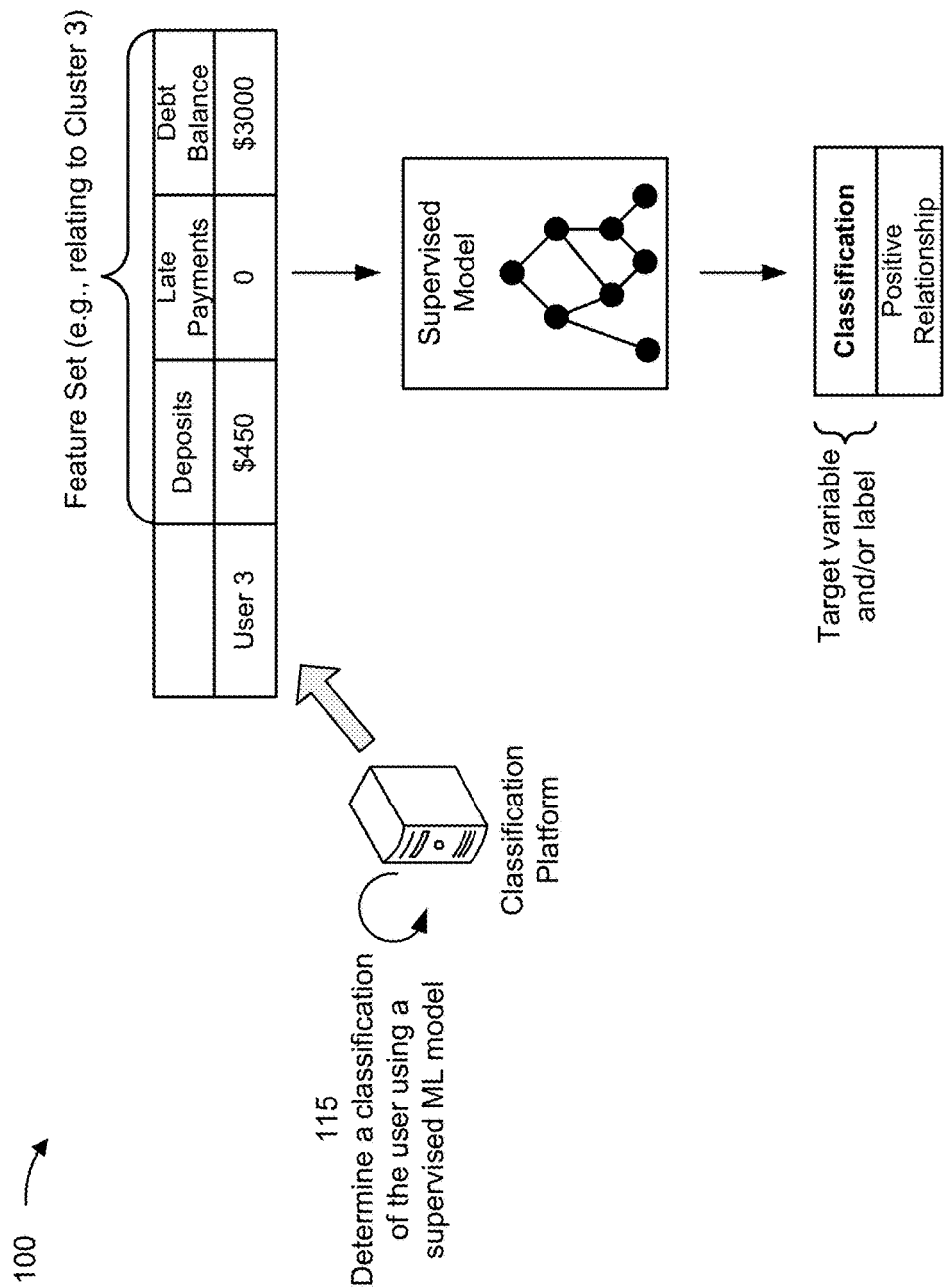

As shown in FIG. 1C and by reference number 115, the classification platform may determine a classification of the user. The classification platform may determine the classification using a supervised model. The classification may identify a level of quality of a relationship between the user and the entity. The relationship may be a customer/provider relationship between the user and the entity, and the level of quality may indicate a degree of positivity associated with the relationship (e.g., how good the relationship is) or a degree of negativity associated with the relationship (e.g., how bad the relationship is). Thus, for example, the classification may indicate that the relationship between the user and the entity is a positive relationship, a neutral relationship, or a negative relationship. In this way, the classification platform may determine the classification of the user using at least one machine learning model (e.g., the supervised model and/or the unsupervised model).

In some implementations, the supervised model may identify the classification as a label for the user (e.g., the label may be positive relationship, neutral relationship, or negative relationship). In some implementations, the supervised model may identify the classification as a score for the user (e.g., from 0 to 100) that indicates the classification (e.g., a score of zero may correspond to a negative relationship, a score of 50 may correspond to a neutral relationship, and so forth). In some implementations, the classification may relate to a particular time period. For example, the classification may indicate the level of quality of the relationship between the user and the entity over a current or previous day, week, month, and/or year, among other examples.

Figure 2:
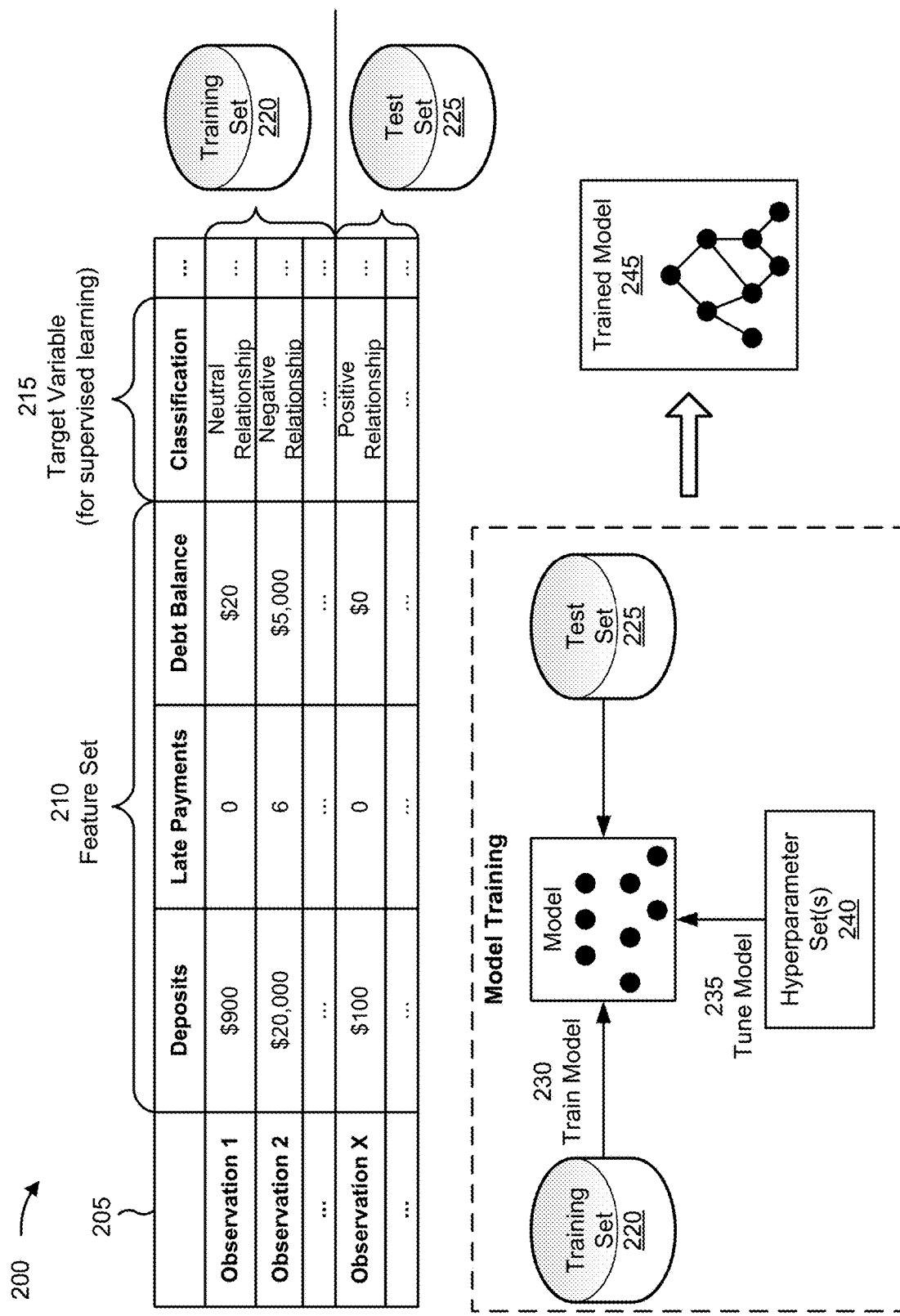
FIG. 2 is a diagram illustrating an example of training a machine learning model in connection with characterizing a relationship between a user and an entity.

The supervised model may be trained to identify the classification based on a plurality of features, as described in additional detail in connection with FIG. 2. The plurality of features for the supervised model may be based on the cluster of users determined using the unsupervised model. For example, the clusters resulting from the one or more preliminary clusterings, described above, may be reviewed by an operator (e.g., a domain expert) of the machine learning system to determine feature sets corresponding to the clusters. Alternatively, the classification platform, or another device, may employ an automated process to determine the feature sets. In some implementations, the classification platform, or another device, may obtain input (e.g., from an operator) that identifies respective feature sets for clusters of users determined using the unsupervised model.

A feature set for classifying users of a particular cluster of users may include features that are relevant to identifying a level of quality of a relationship between the users of the particular cluster and the entity. Thus, feature sets for classifying users of different clusters of users may differ by at least one feature (e.g., a particular feature, such as monthly income, may be relevant to classifying users from a "renters" cluster but may not be relevant to classifying users from a "homeowners with no mortgage" cluster). For example, a first cluster of users may be associated with a first feature set, a second cluster of users may be associated with a second feature set, and so forth. Moreover, a particular cluster of users, determined using the unsupervised model, may correspond to a particular supervised model for classifying a user of the particular cluster of users. For example, the classification platform may classify a first user of a first cluster of users using a first supervised model that uses a first feature set, may classify a second user of a second cluster of users using a second supervised model that uses a second feature set, and so forth. In some implementations, the classification platform may select, from a plurality of supervised models, the supervised model for classifying the user based on the cluster of users to which the user belongs.

In some implementations, the plurality of features used to identify a classification of a user may include one or more of a balance of an account of a user (e.g., an average or current balance), whether a user is associated with a late action (e.g., a late payment or a late deposit) with respect to an account, whether a user is associated with an incomplete action (e.g., a partial payment of a balance or a partial payment of an amount due) with respect to an account, a timeliness by which a user clears account balances (e.g., an average time between accruing an account balance and paying the account balance or an average time between an end of a billing cycle and paying an account balance for the billing cycle), whether a user is associated with a request to cancel an obligation (e.g., whether a user has requested to cancel a debt that is owed), whether a user is associated with a request to reduce an obligation (e.g., whether a user has requested to pay less than a full amount to satisfy a debt owed), an amount of inflows to an account of a user (e.g., an average or total amount of deposits), and/or an amount of outflows from an account of a user (e.g., an average or total amount of withdrawals). Additionally, or alternatively, the plurality of features may include an employment status of a user and/or a rating indicating a degree of hardship experienced by a user, among other examples.

The classification platform may determine one or more actions that are to be performed based on the classification of the user. The one or more actions may include actions that are performed in connection with the account and/or actions that are performed in connection with the user (e.g., in connection with a device of the user). For example, the one or more actions may include adjusting a charge assessed to the account by the entity (e.g., a fee assessed for failing to maintain a minimum account balance or a fee associated with a failure to achieve a threshold amount of deposits, such as direct deposits, in a particular time period), enrolling the user for a particular offering of the entity, and/or providing a notification to the user of a particular offering of the entity, among other examples.

Figure 1D:
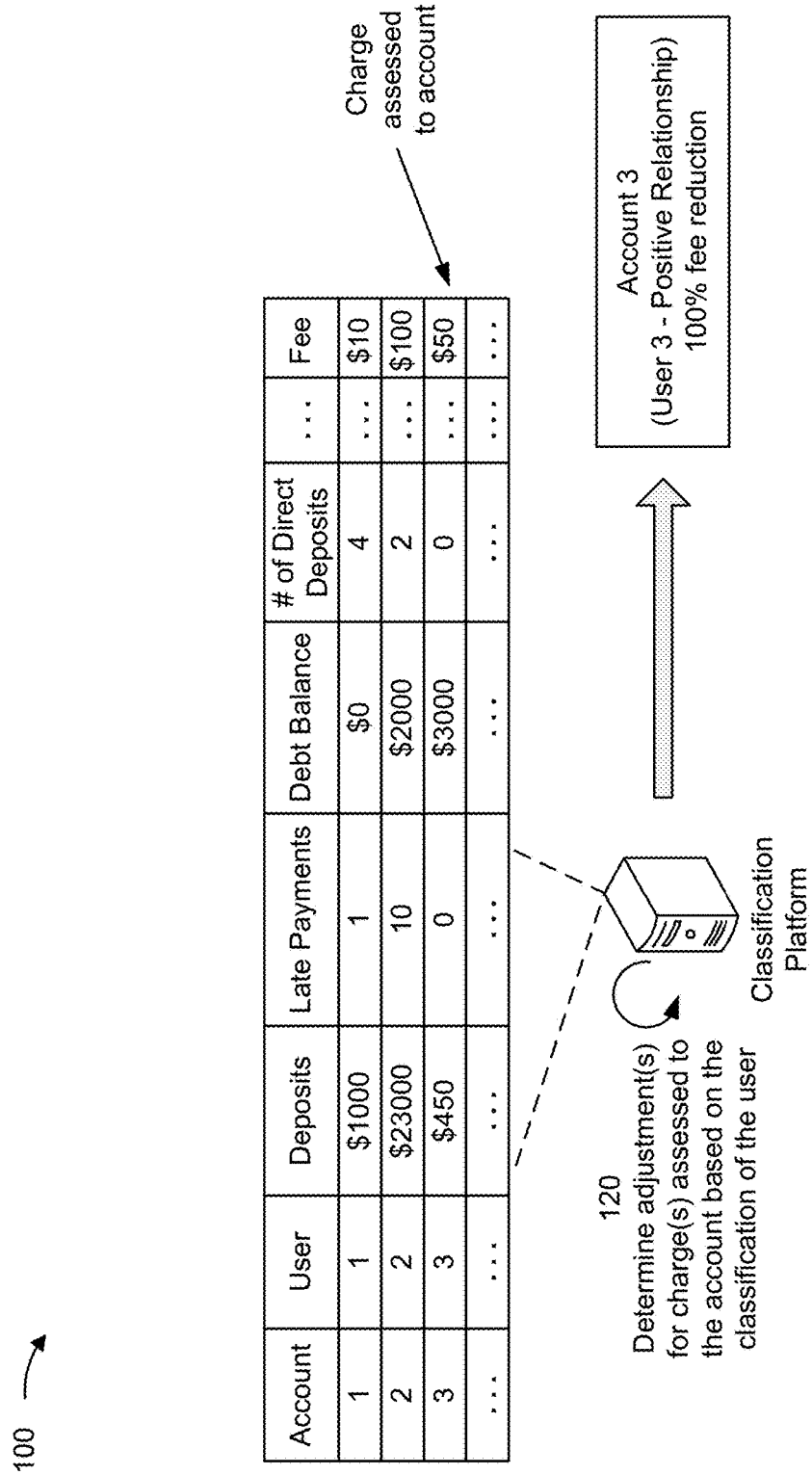

In some examples, as shown in FIG. 1D and by reference number 120, the classification platform may determine one or more adjustments that are to be applied to one or more charges assessed to the account by the entity. The classification platform may determine an adjustment of a charge based on the classification of the user. For example, the classification platform may determine that no adjustment is to be applied if the classification of the user indicates a negative relationship with the entity, or that an adjustment is to be applied if the classification of the user indicates a positive relationship with the entity. In some implementations, the classification platform may determine an amount (e.g., a magnitude) of the adjustment to the charge based on the classification of the user. As an example, the classification platform may determine that an adjustment is to be 0% of a charge if the classification of the user indicates a negative relationship with the entity, that an adjustment is to be 50% of a charge if the classification of the user indicates a neutral relationship with the entity, or that an adjustment is to be 100% of a charge (e.g., a fee is waived) if the classification of the user indicates a positive relationship with the entity.

In some implementations, the classification platform may determine whether the account and/or the user has satisfied a threshold condition for charge adjustment, and the classification platform may determine that an adjustment is to be applied to a charge based on determining that the account and/or the user satisfies the threshold condition. For example, the classification platform may process data for the account for one or more time periods (e.g., one or more months) to determine whether a cumulative deposit amount (e.g., including in-person deposits, mailed-in deposits, and/or deposits via a mobile application) for a particular time period satisfies a threshold value. The classification platform may determine that the account has satisfied the threshold condition based on determining that the cumulative deposit amount for the particular time period satisfies the threshold value. In some implementations, the classification platform may process the data for a particular time period (e.g., a current month) based on detecting a triggering event in the time period. For example, the triggering event may be a deposit being made to the account during the time period. In some implementations, the classification platform (e.g., the machine learning system) may obtain input that identifies a quantity of time periods (e.g., a quantity of months) that are to be processed by the classification platform and/or the threshold value for the cumulative deposit amount.

In some implementations, the classification platform may determine one or more offerings (e.g., products and/or services) of the entity that are to be presented to the user and/or associated with the account. The classification platform may determine an offering based on the classification of the user. For example, the classification platform may determine that the user is to be presented with a first offering (e.g., an auto-payment service of the entity) if the classification of the user indicates a negative relationship with the entity, or a second offering (e.g., a savings account with the entity) if the classification of the user indicates a positive relationship with the entity. In some implementations, the classification platform may determine a value for a parameter of an offering based on the classification of the user. As an example, the classification platform may determine that the user is to be presented with an offering according to a first parameter value (e.g., a credit card with a 15% annual percentage rate) if the classification of the user indicates a negative relationship with the entity, or the offering according to a second parameter value (e.g., the credit card with a 12% annual percentage rate) if the classification of the user indicates a positive relationship with the entity.

Figure 1E:
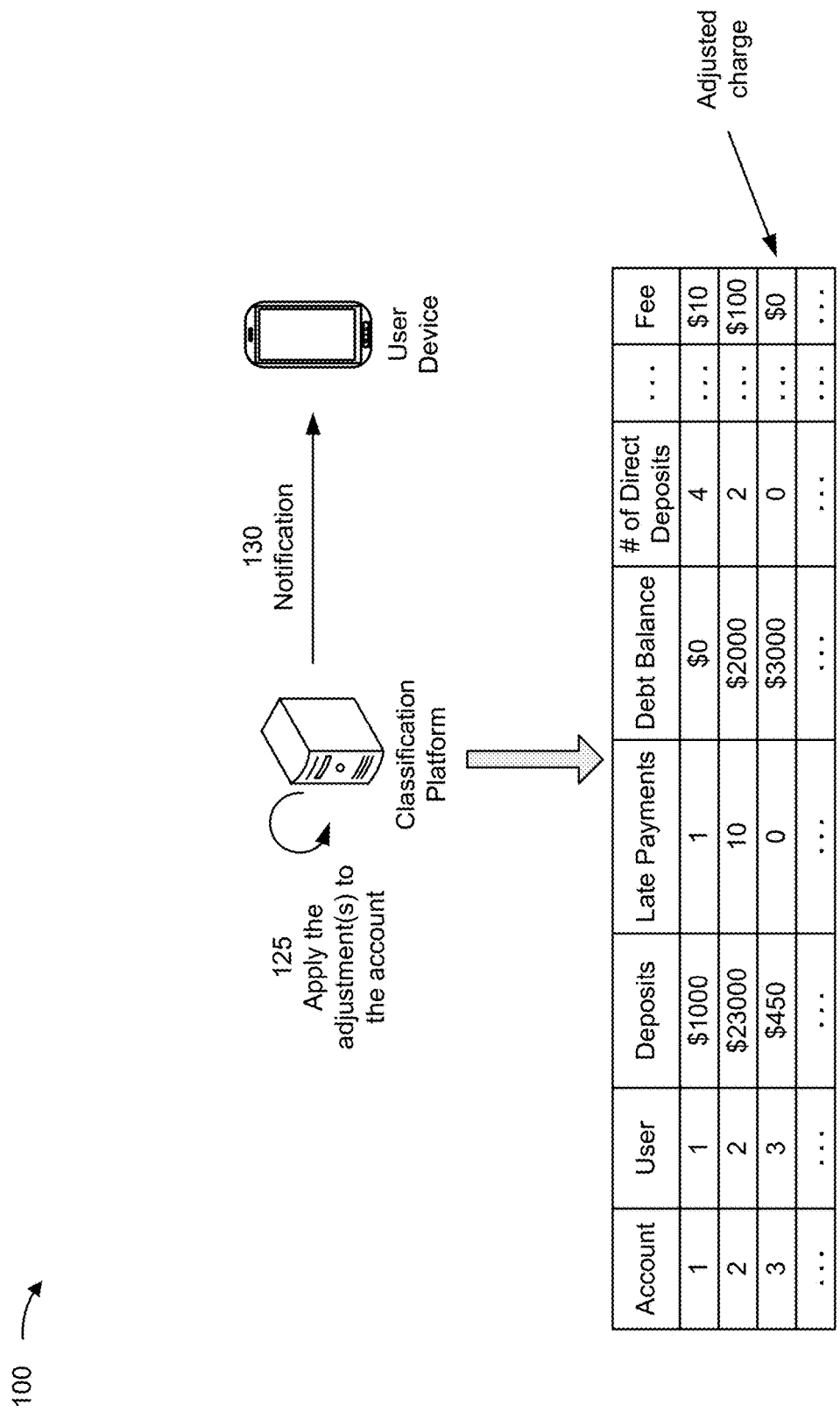

The classification platform may perform the one or more actions based on determining the one or more actions. In some examples, as shown in FIG. 1E and by reference number 125, the classification platform may apply the one or more adjustments to one or more charges of the account (e.g., based on determining the one or more adjustments). For example, the classification platform may update data associated with the account to reflect an adjustment and/or cause funds in an amount of an adjustment to be transferred to the account. In some implementations, the classification platform may enroll (e.g., automatically) the user for an offering that is determined for the user.

As shown by reference number 130, the classification platform may provide (e.g., transmit) a notification to the user device associated with the user (e.g., via an application executing on the user device, via a short message service message, and/or via email, among other examples). In some implementations, the classification platform may associate the notification with the account (e.g., so that the notification is provided in a graphical user interface of the user device when the account is accessed by the user device). The notification may indicate the actions performed by the classification platform, such as the one or more adjustments that were made to the account and/or that the user was enrolled for the offering, among other examples. In some examples, the notification may identify the one or more offerings that are determined for the user. In some examples, the notification may identify a user interface in which the user can enroll for the one or more offerings.

In some implementations, the classification platform may receive a request (e.g., from the user device) to enroll the user for an offering presented to the user. For example, the user may determine to enroll for an offering (e.g., register for a credit card, register for a savings account, apply for a mortgage, etc.) that was presented by the classification platform to the user. However, the user may request enrollment for the offering following a threshold time period (e.g., 1 week or 1 month) from when the offering was presented to the user. Accordingly, the classification platform may determine that the threshold time period is elapsed, and the classification platform may determine an updated classification of the user.

The classification platform may authorize the user to enroll for the offering based on determining that the updated classification indicates a level of quality of the relationship between the user and the entity that satisfies a threshold level of quality (e.g., the level of quality of the relationship between the user and the entity did not fall below a requisite level for the offer). For example, the updated classification may indicate a same or greater level of quality of the relationship between the user and the entity as the level of quality indicated by the initial classification. Alternatively, the classification platform may decline the user's enrollment for the offering based on determining that the updated classification indicates a level of quality of the relationship between the user and the entity that does not satisfy the threshold level of quality. For example, the updated classification may indicate a lesser level of quality of the relationship between the user and the entity as the level of quality indicated by the initial classification. In some implementations, the classification platform may adjust a parameter value of the offering based on determining that the updated classification indicates a change in the level of quality of the relationship between the user and the entity (and enroll the user using the adjusted parameter or present an updated offering to the user using the adjusted parameter).

In this way, the classification platform may automate trend analysis to characterize a relationship between a user and the entity. For example, the classification platform may use the machine learning models described above to determine whether the relationship between a user and the entity is trending in a positive direction, is remaining neutral, or is trending in a negative direction. Accordingly, the classification platform may initially classify the relationship between a user and the entity as being positive but may subsequently classify the relationship as being neutral or negative (e.g., based on actions or behaviors of the user between the initial classification and the subsequent classification). In this way, the classification platform may determine actions to be performed for an account and/or a user that are highly appropriate/relevant to a current relationship state between the user and the entity.

As indicated above, FIGS. 1A-1E are provided as an example. Other examples may differ from what is described with regard to FIGS. 1A-1E.

FIG. 2 is a diagram illustrating an example 200 of training a machine learning model in connection with characterizing a relationship between a user and an entity. The machine learning model training described herein may be performed using a machine learning system. The machine learning system may include or may be included in a computing device, a server, a cloud computing environment, or the like, such as the classification platform described above or a server device 410 described in more detail below.

As shown by reference number 205, a machine learning model, such as the supervised model described above, may be trained using a set of observations. In some implementations, multiple machine learning models, respectively corresponding to clusters of users determined using the unsupervised model described above, may be trained using one or more sets of observations. The set of observations may be obtained and/or input from training data (e.g., historical data), such as data gathered during one or more processes described herein. For example, the set of observations may include data gathered from a data source 430, as described elsewhere herein. In some implementations, the machine learning system may receive the set of observations (e.g., as input) from the data source 430. In some examples, an observation may relate to a user that holds an account with an entity.

As shown by reference number 210, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the data source 430. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. For example, the input from the operator may identify features and/or feature values per cluster of users determined using the unsupervised model, as described above. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of deposits, a second feature of late payments, a third feature of debt balance, and so on. As shown, for a first observation, the first feature may have a value of $900, the second feature may have a value of 0, the third feature may have a value of $20, and so on. These features and feature values are provided as examples and may differ in other examples. For example, the feature set may include one or more of the features described above in connection with FIG. 1C. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 215, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 200, the target variable is a classification that indicates a level of quality of a relationship between a user and an entity, which has a value of "neutral relationship" for the first observation.

The feature set described above is provided as an example, and other examples may differ from what is described above. For example, the feature set described above may be for a first machine learning model used to classify users of a first cluster of users, and a different feature set may be for a second machine learning model used to classify users of a second cluster of users. As an example, the feature of late payments may be in a feature set for a machine learning model used to classify users of a "renters" cluster of users, and the feature of late payments may not be in a feature set for a machine learning model used to classify users of a "homeowners with no mortgage" cluster of users.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, a machine learning model, such as the unsupervised model described above, may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit or tune) the machine learning model, while the test set 225 may be used to evaluate a machine learning model that is trained using the training set 220. For example, for supervised learning, the training set 220 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used and/or based on randomly generating hyperparameter values). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, or closest to a desired threshold) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an apriori algorithm, a k-means algorithm, a support vector machine algorithm, a neural network algorithm (e.g., a convolutional neural network algorithm), and/or a deep learning algorithm.

Figure 3:
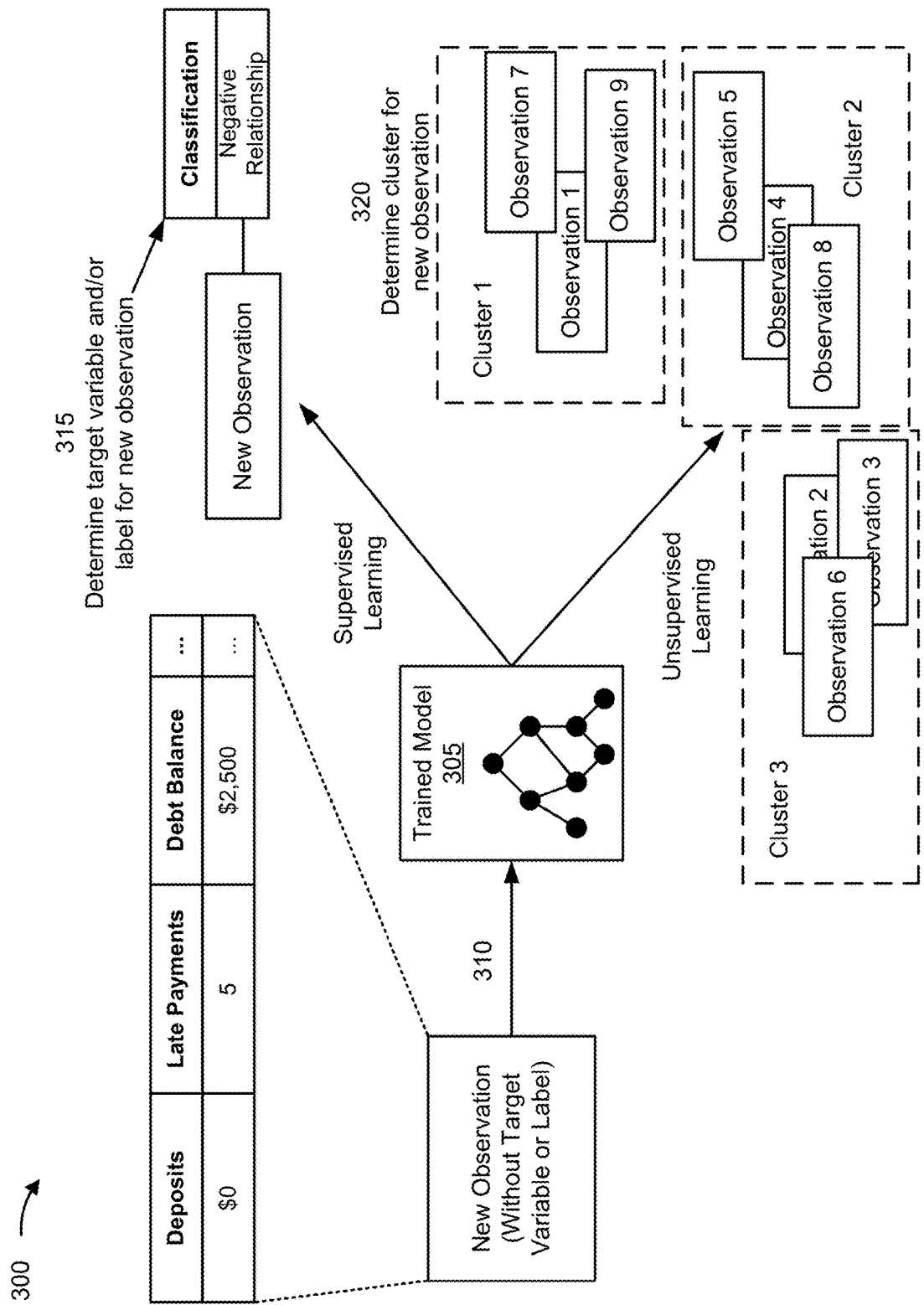
FIG. 3 is a diagram illustrating an example of applying a trained machine learning model to a new observation associated with characterizing a relationship between a user and an entity.

FIG. 3 is a diagram illustrating an example 300 of applying a trained machine learning model to a new observation associated with characterizing a relationship between a user and an entity. In some examples, the new observation may relate to a user that holds an account with an entity. The new observation may be input to a machine learning system that stores a trained machine learning model 305. In some implementations, the trained machine learning model 305 may be the trained machine learning model 245 described above in connection with FIG. 2. The machine learning system may include or may be included in a computing device, a server, or a cloud computing environment, such as the classification system described above or the server device 410.

As shown by reference number 310, the machine learning system may receive a new observation (or a set of new observations) and may input the new observation to a machine learning model 305, such as the supervised model described above. As shown, the new observation may include a first feature of deposits, a second feature of late payments, a third feature of debt balance, and so on, as an example. In some implementations, a new observation that is to be labeled by the supervised model may relate to a new user, or to an existing user associated with updated data (e.g., updated data relating to the feature set used by the supervised model). The machine learning system may apply the trained machine learning model 305 to the new observation to generate an output (e.g., a result). The type of output may depend on the type of machine learning model and/or the type of machine learning task being performed. For example, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed. Additionally, or alternatively, the output may include a predicted (e.g., estimated) value of target variable (e.g., a value within a continuous range of values, a discrete value, a label, a class, or a classification), such as when supervised learning is employed.

In some implementations, the trained machine learning model 305 may predict a value of "negative relationship" for the target variable of "classification" for the new observation, as shown by reference number 315. Based on this prediction (e.g., based on the value having a particular label or classification or based on the value satisfying or failing to satisfy a threshold), the machine learning system may provide a recommendation and/or output for determination of a recommendation, such as a recommendation to adjust a charge assessed to an account by a minimum amount, a recommendation to enroll a user for a first type of offering, and/or a recommendation to present the first type of offering to a user, among other examples. Additionally, or alternatively, the machine learning system may perform an automated action and/or may cause an automated action to be performed (e.g., by instructing another device to perform the automated action), such as adjusting a charge assessed to an account by the minimum amount, enrolling a user for the first type of offering, and/or presenting the first type of offering to a user, among other examples. As another example, if the machine learning system were to predict a value of "positive relationship" for the target variable of "classification," then the machine learning system may provide a different recommendation (e.g., a recommendation to adjust a charge assessed to an account by a maximum amount, a recommendation to enroll a user for a second type of offering, and/or a recommendation to present the second type of offering to a user, among other examples) and/or may perform or cause performance of a different automated action (e.g., adjusting a charge assessed to an account by the maximum amount, enrolling a user for the second type of offering, and/or presenting the second type of offering to a user, among other examples). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values). In some implementations, the machine learning system may log recommendations or automated actions of the machine learning system.

In some implementations, a trained machine learning model 305, such as the unsupervised model described above, may classify (e.g., cluster) a new observation in a cluster, as shown by reference number 320. Here, the new observation may be the same new observation described above, or may be a different new observation. In some implementations, a new observation for clustering by the unsupervised model may relate to a new user, or to an existing user associated with updated data (e.g., updated data relating to the data used by the unsupervised model). The observations within a cluster may have a threshold degree of similarity. As an example, if the machine learning system classifies the new observation in a first cluster (e.g., a "renters" cluster), then the machine learning system may provide the new observation to a first supervised machine learning model for labeling. Additionally, or alternatively, the machine learning system may provide a first recommendation, perform a first automated action, and/or may cause a first automated action to be performed (e.g., by instructing another device to perform the automated action) based on classifying the new observation in the first cluster. As another example, if the machine learning system were to classify the new observation in a second cluster (e.g., a "homeowners with a mortgage" cluster), then the machine learning system may provide the new observation to a second (e.g., different) supervised machine learning model for labeling and/or may provide a second recommendation or may perform or cause performance of a second (e.g., different) automated action.

The unsupervised model may cluster a user based on data associated with the user from a first set of data (e.g., data relating to whether the user has a mortgage, whether the user is a homeowner, whether the user is a renter, etc.), and the supervised model (e.g., associated with the cluster) may label the user based on data associated with the user from a second set of data (e.g., data relating to late payments made by the user, direct deposits made by the user, a minimum account balance of the user, etc.). For example, if a user is associated with new or updated data in the first set of data, the machine learning system may determine a new cluster for the user (or that the user is to remain in a cluster) using the unsupervised model, and the machine learning system may determine a label for the user using a supervised model associated with the new cluster. Here, the supervised model may determine a new classification for the user regardless of whether data associated with the user in the second set of data is new or updated (e.g., because the supervised model may use a different feature set than a feature set used by a supervised model associated with a previous cluster for the user). As another example, if a user is associated with new or updated data in the second set of data, the machine learning system may determine a new label for the user using a supervised model associated with a current cluster for the user (e.g., without re-clustering the user).

In this way, the machine learning system may apply a rigorous and automated process to characterize a relationship between a user and an entity. The machine learning system enables recognition and/or identification of tens, hundreds, thousands, or millions of features and/or feature values for tens, hundreds, thousands, or millions of observations, thereby increasing accuracy and consistency and reducing delay associated with characterizing a relationship between a user and an entity relative to requiring computing resources to be allocated for tens, hundreds, or thousands of operators to manually characterize a relationship between a user and an entity using the features or feature values.

As indicated above, FIG. 3 is provided as an example. Other examples may differ from what is described in connection with FIG. 3.

Figure 4:
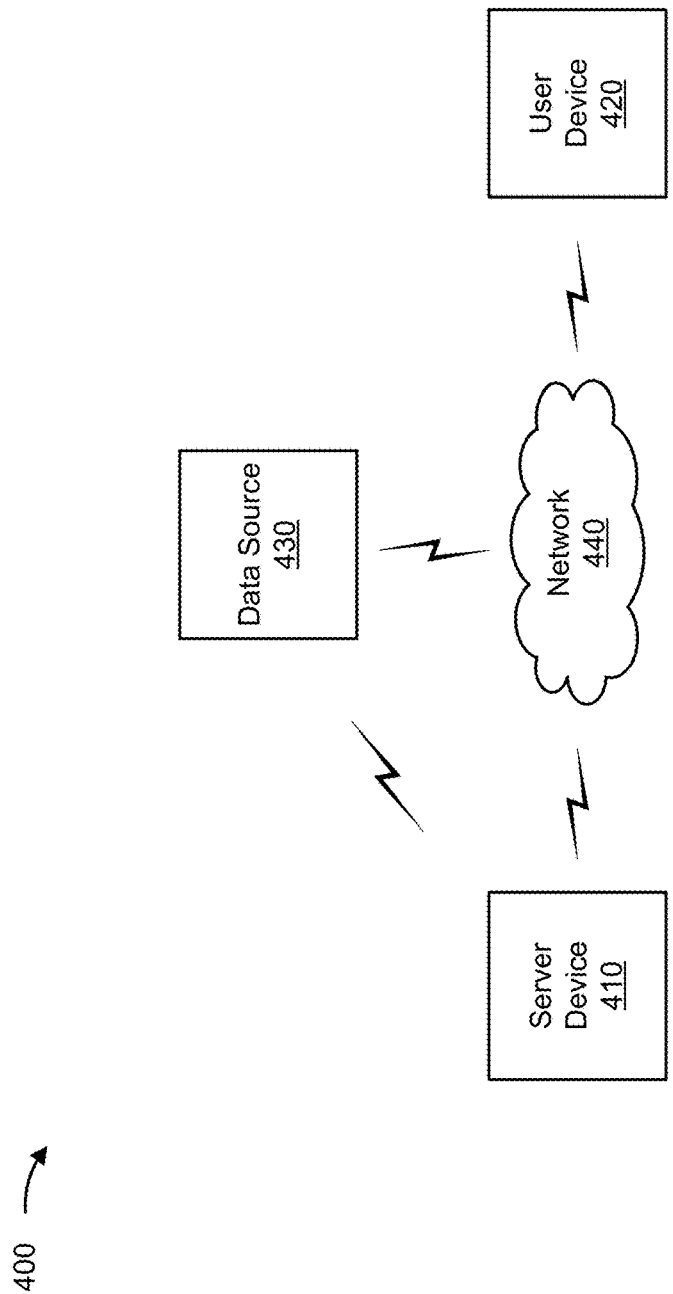
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a server device 410, a user device 420, a data source 430, and a network 440. Devices of environment 400 may interconnect via wired connections, wireless connections, or a combination of wired and wireless connections.

The server device 410 includes one or more devices capable of receiving, generating, storing, processing, providing, and/or routing information associated with characterizing a relationship between a user and an entity, as described elsewhere herein. The server device 410 may include a communication device and/or a computing device. For example, the server device 410 may include a server, such as an application server, a client server, a web server, a database server, a host server, a proxy server, a virtual server (e.g., executing on computing hardware), or a server in a cloud computing system. In some implementations, the server device 410 includes computing hardware used in a cloud computing environment. The server device 410 may include or may be included in the classification platform described above. For example, the server device may include or may be included in the machine learning system described above.

The user device 420 includes one or more devices capable of receiving, generating, storing, processing, and/or providing information associated with receiving a notification, presenting a graphical user interface associated with an account, and/or enrolling for an offering, as described elsewhere herein. The user device 420 may include a communication device and/or a computing device. For example, the user device 420 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The data source 430 includes one or more devices capable of receiving, generating, storing, processing, and/or providing information associated with characterizing a relationship between a user and an entity, as described elsewhere herein. For example, the data source 430 may include data associated with users, user accounts, and/or associated labels. The data source 430 may include a communication device and/or a computing device. For example, the data source 430 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 430 may communicate with one or more other devices of environment 400, as described elsewhere herein.

The network 440 includes one or more wired and/or wireless networks. For example, the network 440 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 440 enables communication among the devices of environment 400.

The quantity and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
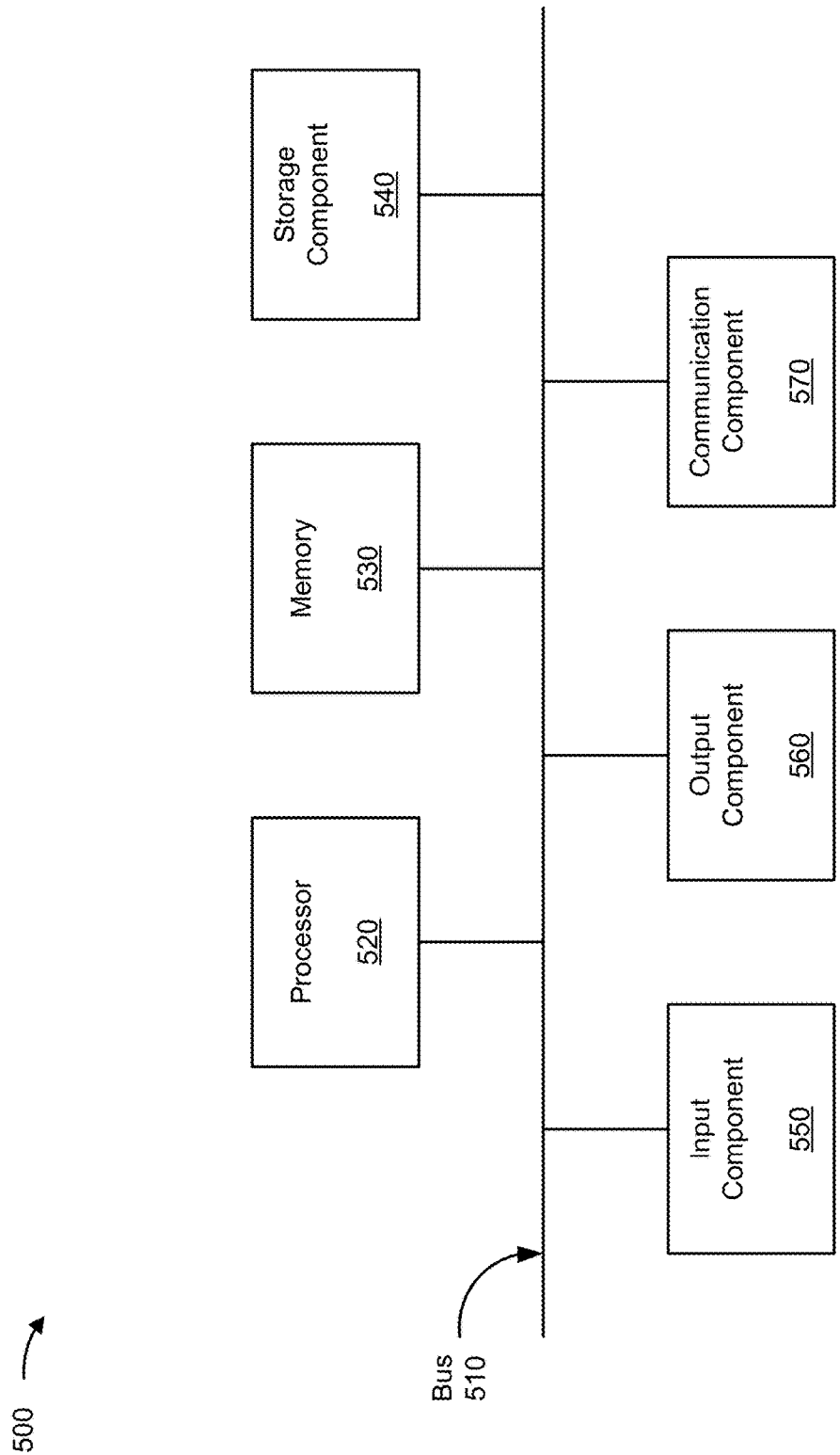
FIG. 5 is a diagram of example components of one or more devices of FIG. 4.

FIG. 5 is a diagram of example components of a device 500, which may correspond to server device 410, user device 420, and/or data source 430. In some implementations, server device 410, user device 420, and/or data source 430 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, and/or an actuator. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, and/or an antenna.

Device 500 may perform one or more processes described herein. For example, a non-transitory computer-readable medium (e.g., memory 530 and/or storage component 540) may store a set of instructions (e.g., one or more instructions, code, software code, and/or program code) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

FIG. 6 is a flowchart of an example process 600 associated with utilizing machine learning models to characterize a relationship between a user and an entity. In some implementations, one or more process blocks of FIG. 6 may be performed by a server device (e.g., server device 410). In some implementations, one or more process blocks of FIG. 6 may be performed by another device or a group of devices separate from or including the device, such as a user device (e.g., user device 420) or a data source (e.g., data source 430). Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include identifying an account associated with a user, where the account is managed by an entity (block 610). As further shown in FIG. 6, process 600 may include determining, using at least one machine learning model, a classification of the user that indicates a level of quality of a relationship between the user and the entity (block 620). As further shown in FIG. 6, process 600 may include determining, based on the classification determined using the at least one machine learning model, one or more adjustments that are to be applied to one or more charges assessed to the account by the entity (block 630). As further shown in FIG. 6, process 600 may include applying the one or more adjustments to the one or more charges (block 640).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for machine learning-based classification, the system comprising:
   one or more memories; and
   one or more processors, coupled to the one or more memories, configured to:
      identify an account associated with a user,
         wherein the account is managed by an entity, and
         wherein the account is identified based on a determination that one or more charges were assessed to the account by the entity;
      determine, using an unsupervised machine learning model, a cluster of users to which the user belongs;
      determine, using a supervised machine learning model, a classification of the user that indicates a level of quality of a relationship between the user and the entity,
         wherein the supervised machine learning model is trained using a plurality of features derived from the cluster of users determined by using the unsupervised machine learning model;
      determine, based on the classification determined using the supervised machine learning model, whether one or more adjustments are to be applied to the one or more charges,
         wherein the determination of whether an adjustment is to be applied includes assessing historical engagement of the user and transaction patterns over a predetermined period, and
         wherein assessing the historical engagement of the user and the transaction patterns includes assessing, over the predetermined period, one or more of: a balance of the account, occurrences of late actions, incomplete actions, timeliness of clearing account balances, a request to cancel an obligation, a request to reduce an obligation, or amounts of inflows and outflows in the account;
      apply the one or more adjustments to the one or more charges based on determining that the one or more adjustments are to be applied to the one or more charges; and
      cause funds in an amount of the one or more adjustments to be transferred to the account based at least in part on applying the one or more adjustments.

2. The system of claim 1, wherein the level of quality of the relationship indicated by the classification is associated with a degree of positivity of the relationship or a degree of negativity of the relationship.

3. The system of claim 1, wherein the one or more processors, when determining whether the one or more adjustments are to be applied to the one or more charges, are configured to:
   determine a magnitude of the one or more adjustments that are to be applied to the one or more charges based on the classification.

4. The system of claim 1, wherein the classification is determined for a particular time period.

5. The system of claim 1, wherein the one or more processors are further configured to:
   select the supervised machine learning model for classification of the user, from a plurality of supervised machine learning models, based on the cluster of users to which the user belongs.

6. The system of claim 5, wherein the one or more processors are further configured to:
   obtain one or more inputs that identify the plurality of features.

7. The system of claim 1, wherein the one or more processors are further configured to:
   obtain one or more inputs that assign respective labels for clusters of users determined using the unsupervised machine learning model.

8. A non-transitory computer-readable medium storing a set of instructions, the set of instructions comprising:
   one or more instructions that, when executed by one or more processors of a device, cause the device to:
      identify an account associated with a user,
         wherein the account is managed by an entity, and
         wherein the account is identified based on a determination that a balance of the account satisfies one or more conditions;
      determine, using an unsupervised machine learning model, a cluster of users to which the user belongs,
         wherein the unsupervised machine learning model is used to group the users into segments based on one or more attributes, and wherein the one or more attributes relate to: transactions between the user and the entity, or a behavioral pattern of the user;
      determine, using a supervised machine learning model, a classification of the user that indicates a level of quality of a relationship between the user and the entity,
         wherein the supervised machine learning model is trained to identify the classification based on a plurality of features, and
         wherein the plurality of features are based on the cluster of users determined using the unsupervised machine learning model;
      determine, based on the classification determined using the supervised machine learning model, one or more actions that are to be performed,
         wherein the determination of the one or more actions to be performed includes assessing historical engagement of the user and transaction patterns over a predetermined period, and
         wherein assessing the historical engagement of the user and the transaction patterns includes assessing, over the predetermined period, one or more of: a balance of the account, occurrences of late actions, an incomplete action, a timeliness by which the user clears account balances, a request to cancel an obligation, a request to reduce an obligation, an amount of inflows to the account of the user, or an amount of outflows from the account of the user; and perform the one or more actions based on determining the one or more actions.

9. The non-transitory computer-readable medium of claim 8, wherein the one or more actions include one or more of:
adjusting a charge assessed to the account by the entity,
enrolling the user for an offering of the entity, or
providing a notification to the user of an offering of the entity.

10. The non-transitory computer-readable medium of claim 8, wherein the one or more instructions further cause the device to:
select the supervised machine learning model for classification of the user, from a plurality of supervised machine learning models, based on the cluster of users to which the user belongs.

11. The non-transitory computer-readable medium of claim 8, wherein the plurality of features include one or more of:
the balance of the account of the user,
whether the user is associated with a late action with respect to the account,
whether the user is associated with an incomplete action with respect to the account,
the timeliness by which the user clears account balances,
whether the user is associated with the request to cancel the obligation,
whether the user is associated with the request to reduce the obligation,
the amount of inflows to the account of the user, or
the amount of outflows from the account of the user.

12. The non-transitory computer-readable medium of claim 8, wherein the one or more instructions further cause the device to:
obtain one or more inputs that identify the plurality of features.

13. A method for machine learning-based classification, comprising:
identifying, by a device, an account associated with a user,
wherein the account is managed by an entity, and
wherein the account is identified based on a determination that one or more charges were assessed to the account by the entity;
determining, by the device and using at least one machine learning model, a classification of the user,
wherein the classification comprises a score for the user that indicates a level of quality of a relationship between the user and the entity;
determining, by the device and based on the classification determined using the at least one machine learning model, one or more adjustments that are to be applied to the one or more charges,
wherein the determination of the one or more adjustments to be applied includes assessing historical engagement of the user and transaction patterns over a predetermined period, and
wherein assessing the historical engagement of the user and the transaction patterns includes assessing, over the predetermined period, one or more of: a balance of the account, occurrences of late actions, an incomplete action, a timeliness by which the user clears account balances, a request to cancel an obligation, a request to reduce an obligation, an amount of inflows to the account of the user, or an amount of outflows from the account of the user;
applying, by the device, the one or more adjustments to the one or more charges; and
causing, by the device, performance of an update to information associated with the account to reflect the one or more adjustments.

14. The method of claim 13, wherein determining the classification of the user comprises:
determining, using an unsupervised machine learning model, a cluster of users to which the user belongs; and
determining, using a supervised machine learning model, the classification of the user,
wherein the supervised machine learning model is trained to identify the classification based on a plurality of features, and
wherein the plurality of features are based on the cluster of users determined using the unsupervised machine learning model.

15. The method of claim 14, further comprising:
selecting the supervised machine learning model for classification of the user, from a plurality of supervised machine learning models, based on the cluster of users to which the user belongs.

16. The method of claim 14, wherein a first set of data is used when determining the cluster of users using the unsupervised machine learning model, and
wherein a second set of data is used when determining the classification using the supervised machine learning model.

17. The method of claim 14, further comprising:
obtaining one or more inputs that assign respective labels for clusters of users determined using the unsupervised machine learning model.

18. The method of claim 14, further comprising:
obtaining one or more inputs that identify the plurality of features.

19. The method of claim 13, wherein the level of quality of the relationship indicated by the classification is associated with a degree of positivity of the relationship or a degree of negativity of the relationship.

20. The method of claim 13, wherein determining whether the one or more adjustments are to be applied to the one or more charges comprises:
determining a magnitude of the one or more adjustments that are to be applied to the one or more charges based on the classification.

* * * * *